Patented Oct. 6, 1925.

1,555,951

UNITED STATES PATENT OFFICE.

WILLIAM LUDNELL OWEN, OF NEW ORLEANS, LOUISIANA.

INSECTICIDE.

No Drawing. Application filed October 4, 1923. Serial No. 666,620.

*To all whom it may concern:*

Be it known that I, WILLIAM L. OWEN, a citizen of the United States, residing at New Orleans, in the parish of Orleans, State of Louisiana, have invented certain new and useful Improvements in Insecticides, of which the following is a description.

This invention relates to insecticides.

The primary object of the invention is to provide an insecticide which comprises an insoluble poison, and a carrying medium therefor, which medium is insusceptible of chemical and bacteriologically produced changes, which maintains the poison in a state of colloidal suspension in the medium; which does not increase the solubility of the poison, which permits of a much greater distribution of the poison in the medium, and which acts as a binder to cause the poison to adhere to the plant upon which it is deposited A further object of the invention resides in providing an insecticide which most readily lends itself to preparation in the form of a jelly thereby eliminating the danger due to inhalation of the toxic dust, or to disadvantages in handling a shipment such as would inevitably occur if the insecticide were either in the form of a powder or a liquid.

A particular feature of the invention resides in providing a carrying medium for the calcium arsenate which will not ferment nor decompose in the presence of the arsenate and liberate arsenic acid.

These and other objects will appear from a perusal of the following specification.

In order to carry out the invention, I dissolve agar in water, making a two percent solution. I then add to a pint of the solution, a pound of poison, specifically, calcium arsenate.

The insecticide thus prepared, is preferably sprayed on the plants, bushes or other object to be treated. It is especially effective in the destruction of the boll weevil.

While the insecticide may be prepared for sale and use in the form of a powder to be dissolved in water or in the form of a solution, as above described, I prefer to provide it as a jelly to be dissolved in water prior to its application. In the jelly form, it is particularly desirable since it is easier to ship in containers without leakage and especially for the reason that there is no danger of a user inhaling the toxic dust as when put up in powder form. The agar, being a gelatinous substance, is highly adapted for this use.

One of the main advantages derived from this use of agar resides in its capability of effectively binding the poison to the plant or other object. For when the water in the insecticide evaporates, the gelatinous substance causes the poison to adhere firmly to the plant and the longer it remains the more effective the adherence.

Another distinct advantage flowing from the use of agar resides in its capability to hold the poison in a state of colloidal suspension due to the viscosity of the agar. The agar shows a marked tendency to effect a more uniform and thorough distribution of the poison throughout the body of the mixture so that sporadic accumulations of the poison are not manifest. This enables a perceptible saving in the amount of poison used per unit quantity of carrying body.

Yet another benefit derived from the use of agar is its inertness and insusceptibility of chemical or bacteriological changes. For instance, it has heretofore been proposed to use casein and dextrine as carrying mediums for a poison. However, these substances are objectionable. The former being an albuminoid is very easily acted upon and decomposed by bacteria, thus destroying all of its adhesive properties. Dextrine is an intermediate product formed in the hydrolysis of starch by acid or by the enzyme diastase. It can be converted into sugar and is so converted in the complete hydrolysis. Since diastase is secreted by many micro-organisms, dextrine cannot be considered very stable under the above conditions. It is doubtful whether the mere presence of the relatively insoluble arsenate will prevent this decomposition of the adhesive substance from taking place. On the other hand, agar is a pectin, which is so insusceptible to the action of micro-organisms and so chemically inert, that it may be regarded as a highly stable medium under all circumstances, and particularly so under the conditions of its present employment. Moreover, agar is especially stable when used with calcium arsenate. If an adhesive substance used with calcium arsenate undergoes any change, either from fermentation or by spontaneous decomposition, which increases the acidity of the solution, then more arsenic acid is liberated and as a result, the foliage of the plant may be greatly injured. This often happens, for example, with the use of molasses, which, at the present time, is greatly in use. It cannot happen with agar.

Still another advantageous feature of the use of agar is its extreme cheapness.

What I claim and desire to secure by Letters-Patent, is—

1. An insecticide in jelly form consisting of agar and a poison.

2. An insecticide consisting of agar jelly and a poison distributed throughout the body of the jelly in colloidal suspension.

3. An insecticide consisting of agar jelly and calcium arsenate distributed therethrough.

4. The method of preparing poisonous insecticides for transport in indisseminable condition which comprises distributing the said insecticide in colloidal solution in agar jelly.

In testimony whereof, I affix my signature.

WILLIAM LUDNELL OWEN.